United States Patent [19]

Carlson

[11] Patent Number: 4,721,469
[45] Date of Patent: Jan. 26, 1988

[54] TURNING CORD
[75] Inventor: John A. Carlson, Wayne, Pa.
[73] Assignee: Teleflex Incorporated, Limerick, Pa.
[21] Appl. No.: 917,527
[22] Filed: Oct. 10, 1986
[51] Int. Cl.$^4$ .............................................. H01R 39/00
[52] U.S. Cl. ............................................ 439/13; 439/4
[58] Field of Search ....................... 339/3 R, 3 S, 5 R; 439/4, 13

[56] References Cited
U.S. PATENT DOCUMENTS 3,765,455  10/1973  Confer et al. ................... 339/3 S
4,540,223   9/1985  Schmerda et al. ............... 339/3 S
4,607,898   8/1986  Reighard et al. ................ 339/3 S Primary Examiner—Z. R. Bilinsky
Attorney, Agent, or Firm—Reising, Ethington, Barnard, Perry & Milton

[57] ABSTRACT

An assembly to eliminate slack in a length of cord (20, 120) extending between axially spaced first (12, 112) and second (14, 114) cylindrical members. The cord (20) is wrapped in coiled lengths (22, 24, 122, 124) on the interior side walls (18, 19, 118, 119) of each member (12, 14, 112, 114). A control means (34, 134) acts between the members (12, 14, 112, 114) and coiled lengths (22, 24, 122, 124) to coil the cord (20, 120) onto one coiled lengths (22, 24, 122, 124) while uncoiling the cord (20, 120) from the other coiled length (24, 22, 124, 122). A guide means (36, 136) guides the cord (20, 120) onto and off of one of the coiled lengths (22, 24, 122, 124) while rolling means (38, 138) hold the coiled lengths (22, 24, 122, 124) in position to eliminate slack. The control means (34, 134) specifically includes at least two spokes, one (42, 142) to engage the U-shaped loop (32, 132) in the cord (20, 120) between the coiled lengths (22, 24, 122, 124) with the one or more spokes (40, 140) disposed within circular O-rings in rolling engagement with the respective coiled lengths (22, 24, 122, 124).

24 Claims, 4 Drawing Figures

TURNING CORD

TECHNICAL FIELD

The invention relates to an electrical cable connection assembly, and more particularly to an assembly for establishing a continuous electrical connection between relatively rotatable members.

BACKGROUND ART

Multi-turn cable connection assemblies have been used to eliminate slack between a rotatable member and a stationary or a relatively rotatable member. Such assemblies have been used in steering assemblies to establish electrical connection between the steering wheel and the steering column, i.e., the mechanical lead for the horn button. As one of the members rotates, slack of the electrical cable increases between the two members.

Various assemblies accommodate the slack. One type of such assembly includes a rotatable shaft with a first flange extending radially outwardly in the spiral configuration along the shaft. A second spiral flange is secured to a support structure and is at a second circumference around the shaft. As the shaft rotates in a first direction the cables is coiled about the shaft guided by the first flange. As the shaft is rotated in a second direction the cable is laid upon the second flange. This assembly attempts to eliminate slack in the cable independent upon the direction the shaft is rotated. U.S. Pat. No. 2,955,271 granted Oct. 4, 1960 in the name of J. E. Dawkins discloses such a system where a shaft contains a first spiral flange extending radially outward from the shaft with a second spiral flange on a support structure about the shaft at a second circumference. The problem with this type of assembly is that slack is eliminated only when the cable has completely wrapped upon the shaft. When the cord lays upon the second flange, only the rigidity of the cable itself holds the cable in place.

SUMMARY OF THE INVENTION

The assembly eliminates slack in a length of cord which extends between first and second members co-axially rotatable relative to one another about an axis of rotation. The assembly comprises a first member rotatable about the rotational axis relative to a second member disposed on the same axis. A cord has a first coiled length coiled about the axis and is supported by the first member. The cord has a second coiled length about the axis and supported by the second member. The cord includes a loop extending between the first and second coil lengths. The first coiled length is wound in the direction opposite to that of a second coiled length. The assembly is characterized by a control means which is responsive to relative rotation between the first and second members for coiling the cord in to one of the coiled lengths while simultaneously uncoiling the cord out of the other coiled length while simultaneously moving the loop about the first axis.

The present invention improves the prior art by guiding the cord along a support member and holding the cord in that position so that slack is eliminated when the assembly is rotated in either direction.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF PREFERRED EMBODIMENT

Figure 1:
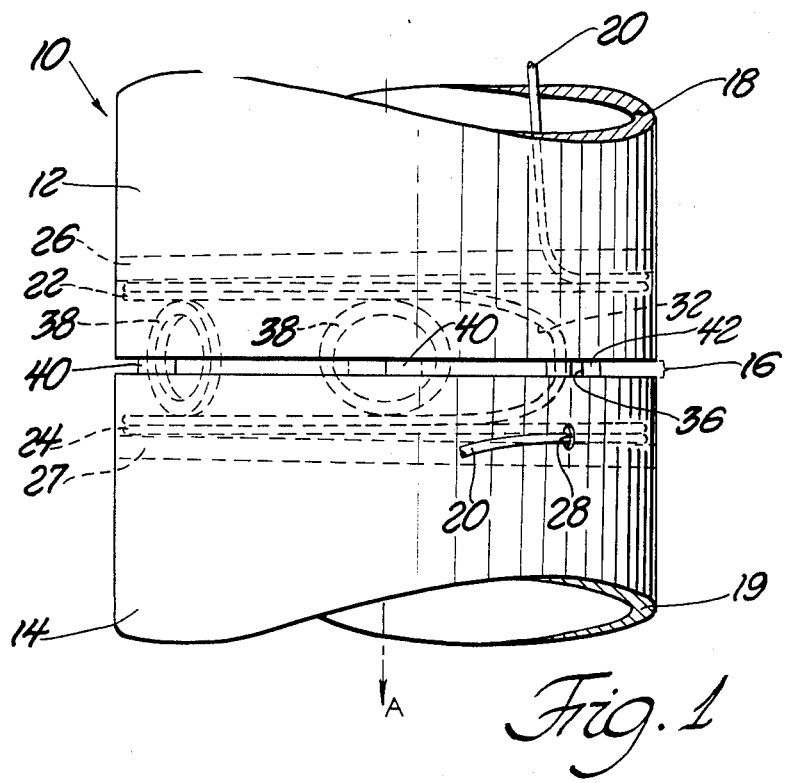
FIG. 1 is a side view of the preferred embodiment of the subject invention.
Figure 2:
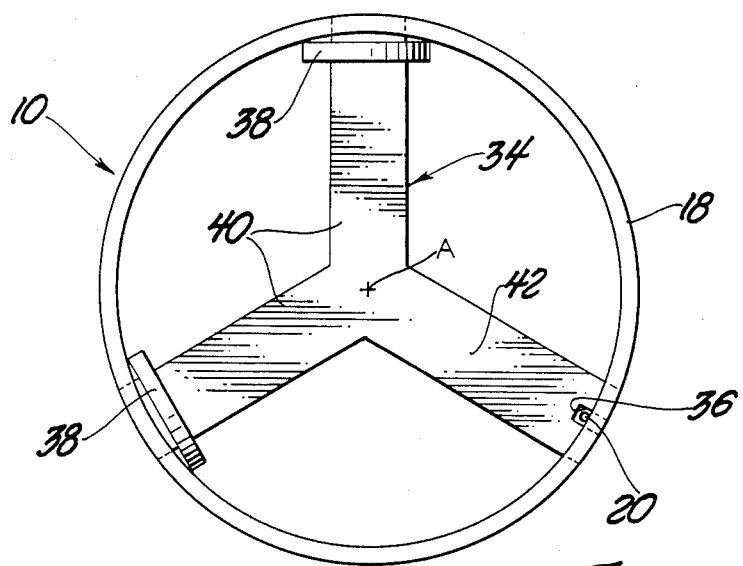
FIG. 2 is a top view of the preferred embodiment of the subject invention.
Figure 3:
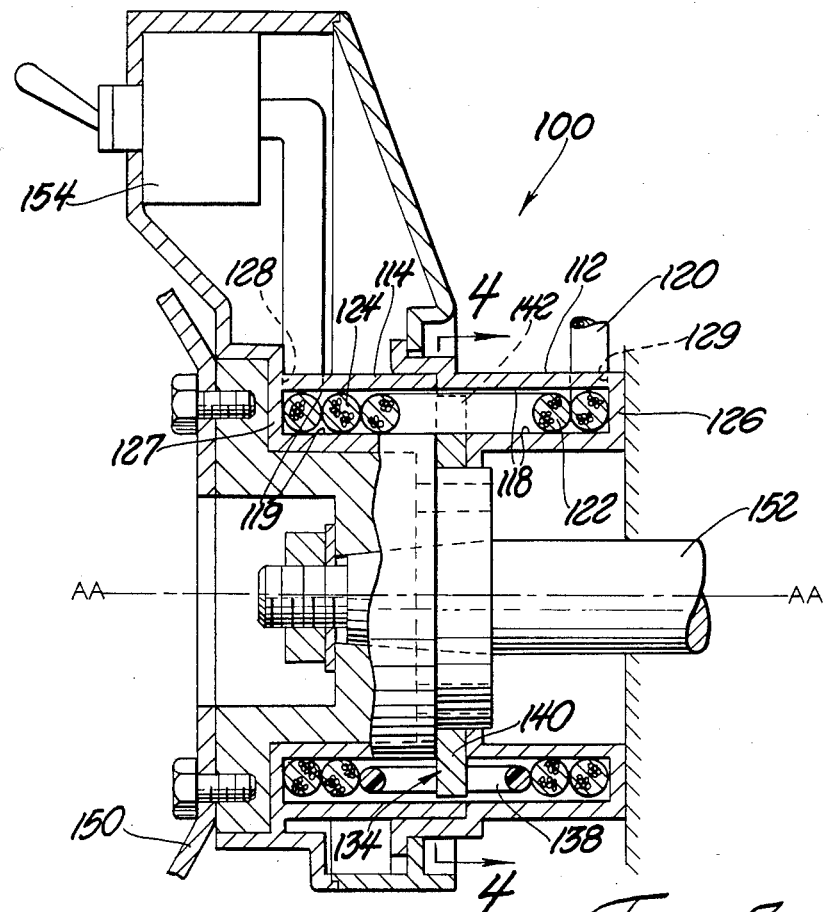
FIG. 3 is a partially cut away side view of a second embodiment of the subject invention.
Figure 4:
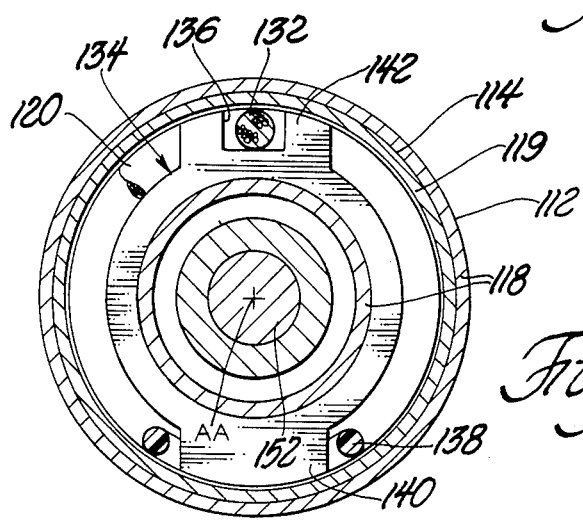
FIG. 4 is a top view of the control means of the second embodiment.

An assembly constructed in accordance with the subject invention is generally shown at 10 and 100. A first embodiment is shown in FIGS. 1 and 2 and a second more specific embodiment is shown in FIGS. 3 and 4 which is a marine steering assembly. The assembly 10, 100 includes first and second members 12, 112 and 14, 114 co-axially rotatably relative to one another about an axis A, AA. The first member 12, 112 is rotatable about the rotational axis A, AA. The second member 14, 114 is disposed on the same axis A, AA, usually held stationary but rotatably supported in some cases. Typically one of the members 12, 14, 112, 114 is fixed to a support structure which also rotatably supports a coaxial shaft fixed to the other member 12, 14, 112, 114 for rotation together. The second member 14, 114 is axially spaced from the first member 12, 112 with a separation 16, 116 therebetween. In the first embodiment, the first 12 and second 14 members may be hollow cylinders with side walls 18, 19. The first 12 and second 14 members have equal diameters on the interior of the side walls 18. A specific application of the assembly is in steering assemblies for boats and automotive vehicles. The steering column remains stationary while the steering wheel and shaft is rotatable. The second embodiment is specifically used for marine steering application and is shown in FIGS. 3 and 4. The first 112 and second 114 members contain annular cavities having radial spaced side walls 118, 119. The first member 112 remains stationary while the second member 114 is rotated by and with a steering wheel 150. The steering wheel 150 rotates a steering shaft 152 which steers the marine vehicle.

The assembly includes an electrical cord or cable 20, 120 which has a first coiled length 22, 122 coiled about the axis A, AA and supported by the first member 12, 112. A second coiled length 24, 124 is coiled about the axis A, AA and is supported by the second member 14, 114. The cord 20, 120 is coiled into coiled lengths 22, 24, 122, 124 between the interior of the side walls 18, 19 of the first embodiment and between the side walls 118, 119 of each cavity in the second embodiment. In the first embodiment, the first 12 and second 14 members include ridge means 26, 27 on the interiors of the side walls 18, 19 which support the coiled lengths 22, 24. In the second embodiment, the members 112, 114 include base portions 126, 127 interconnecting each pair of spaced side walls 118, 119 for supporting the coiled lengths 122, 124 between the side walls 118, 119. The second member 14, 114 includes a cord hole 28, 128 in the side wall 19, 119. The cord hole 28, 128 is used to thread the cord 20, 120 into the assembly 10, 100 from a power source or the like. The other end of the cord 20, 120 is usually attached electronic devices on the rotatable steering wheel to rotate therewith. In the second embodiment, a second cord hole 129 is used to thread the cord 120 out of the assembly 100.

The cord 20, 120 includes a loop 32, 132 which extends between the first 22, 122 and second 24, 124 coiled lengths which is produced by the first coiled length 22, 122 wound in the direction opposite to that of the second coiled length 24, 124. In other words, the cord 20, 120 may be coiled downwards counterclockwise within the first member 12, 112 and upwards from the cord hole 28, 128 within the second member 14, 114. The cord 20, 120 is wrapped in opposite directions to create the loop 32, 132.

The assembly 10, 100 is characterized by control means generally shown at 34, 134 which is responsive to the relative motion between the first 12, 112 and second 14, 114 members for coiling the cord 20, 120 into one of the coiled lengths 22, 24, 122, 124 and for simultaneously uncoiling the cord 20, 120 out of the other coiled length 24, 22, 124, 122 while simultaneously moving the loop 32, 132 about the axis A, AA. The control means 34, 134 includes guide means 36, 136 adjacent in the loop 32, 132 of the cord 20, 120 for rotating about the axis A, AA in response to the rotation of the loop 32, 132 upon rotation of the guide means 36, 136. The loop 32, 132 will rotate at half the speed of one rotating member 12, 14, 112, 114 when the other member 14, 12, 114, 112 is held stationary. The guide means 36, 136 comprises a fork which defines a slot for receiving the cord 20, 120 and for moving the control means 34, 134 circumferentially about the axis A, AA.

The control means 34, 134 also includes rolling means 38, 138 disposed between the first 22, 122 and second 24, 124 coiled lengths for rolling along the cord 20, 120 in one of the coiled lengths 22, 24, 122, 124 while simultaneously rolling along the cord 20, 120 in the other coiled length 24, 22, 124, 122. The rolling means 38, 138 has a variable diameter for continuous frictional contact along the coiled lengths 22, 24, 122, 124. The rolling means 38, 138 comprises at least one elastomeric O-ring for assuming an oval configuration to act as a spring to guide the cord 20, 120. The oval ring 38, 138 moves in response to the rotating of the cord loop 32, 132 and therefore in response to the rotating of either of the members 12, 14, 112, 114.

The control means 34, 134 includes spacing means 40, 42, 140, 142 for angularly spacing the rolling means 38, 138 and the guide means 36, 136. The spacing means 40, 42, 140, 142 is slidingly retained within the separation 16, 116. The spacing means 40, 42, 140, 142 comprises spokes which extend radially outward from the axis A, AA into the separation 16, 116 which maintains the angular circumferential spacing of the rolling means 38, 138 and the guide means 36, 136. There are at least two spokes 40, 42, 140, 142 which are generally equally spaced, wherein one spoke 42, 142 contains the fork and at least one spoke 40, 140 contains an O-ring 38, 138. In the first embodiment shown in FIGS. 1 and 2, three spokes 40, 42 are used which are equally spaced 120 degrees apart circumferentially about the axis A. Two of the spokes 40 contain two elastomeric rings 38, or rolling means, and the third spoke 42 contains the fork 36 for creating the cord loop 32. In the second embodiment, only two spokes 140, 142 are used with one containing the cord loop 132 and the second containing an O-ring 138. The spokes 40, 140 extend through the rolling means 38, 138 for rolling the rolling means 38, 138 about the axis A, AA in response to rotation of the loop 32, 132. The non-fork spokes 140 include elastomeric O-rings which are rotatably supported by the spokes 40, 140.

The cord 20, 120 and rings 38, 138 tend to be self-propelled and the primary purpose of spokes 40, 42, 140, 142 is to maintain the correct spacing. In effect, the rotation of the loop 32, 132 causes the rotation of the spoke 42, 142 and therefore spokes 40, 140 to the space rings 38, 138.

The number of turns of the assembly is determined by the number of coiled lengths 22, 24, 122, 124. One turn of the cord 20, 120 provides for two relative turns of the first 12, 112 and second 14, 114 members.

The following is the general operation of the assembly. The assembly shown in FIG. 1 can be used in an environment which requires up to eight turns or rotations of a member or steering wheel. Therefore as shown in FIG. 1, there are four coiled lengths 22, 24, two of the coiled lengths 22 being on the first rotatable member 12 and two 24 on the second member 14. If the second member 14 is held stationary while the first member 12 is rotated counterclockwise as shown by the arrow, the loop 32 will move in the same counterclockwise direction, causing the rings 38 to individually rotate in the clockwise direction about their respective axes. The coiled length 22 will be uncoiled from the first member 12 and coiled upon the second member 14. Therefore, the spokes 40, 42 will rotate at half the speed of the first rotatable member 12.

For marine steering application, four complete turns or rotations of one of the members 12, 14 is required and therefore two coiled lengths 22, 24 are necessary, as shown in the second embodiment in FIG. 3. The necessity of the cord or electrical cable 120 is shown in conjunction with the invention by connecting a switch assembly 154 located with the steering wheel 150 by the cord 120 extending from the steering wheel 150 through to the inside of the vehicle.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An assembly to eliminate slack in a length of cord extending between first and second members co-axially rotatable relative to one another about an axis of rotation, said assembly comprising; a first member (12, 112) rotatable about a rotational axis (A, AA), a second member (14, 114) disposed on said axis (A, AA) axially spaced from said first member (12, 112), a cord (20, 120) having a first coiled length (22, 122) coiled about said axis (A, AA) and supported by said first member (12, 112), said cord (20, 120) having a second coiled length (24, 124) coiled about said axis (A, AA) and supported by said second member (14, 114), control means (34, 134) responsive to relative rotation between said first (12, 112) and second (14, 114) members for coiling said cord (20, 120) into one of said coiled lengths (22, 24, 122, 124) while simultaneously uncoiling said cord (20, 120) out of the other coiled length (24, 22, 124, 122) while simultaneously moving said loop (32, 132) about said axis (A, AA), said control means characterized by rolling means (38, 138) between said coiled lengths (22, 24, 122, 124) for rolling along said cord (20, 120) in one of said coiled lengths (22, 24, 122, 124) while simultaneously rolling along said cord (20, 120) in the other coiled length (24, 22, 124, 122).

2. An assembly as set forth in claim 1 further characterized by said cord (20, 120) including a U-shaped loop (32, 132) extending between said first (22, 122) and second (24, 124, 124) coiled lengths, said first coiled length (22, 122) wound in the direction opposite to that of said second coiled length (24, 124).

3. An assembly as set forth in claim 2 further characterized by said control means (34, 134) including a guide means (36, 136) adjacent said cord (20, 120) in said loop (32, 132) for rotating said loop (32, 132) about said axis (A, AA) upon rotation of said guide means (36, 136).

4. An assembly as set forth in claim 3 further characterized by said rolling means (38, 138) including a variable diameter for continuous frictional contact along said coiled lengths (22, 24, 122, 124).

5. An assembly as set forth in claim 4 further characterized by said control means (34, 134) including spacing means (40, 42, 140, 142) for angularly spacing said rolling means (38, 138) and said guide means (36, 136).

6. An assembly as set forth in claim 5 further characterized by said second member (14, 114) being axially spaced from said first member (12, 112) to provide a separation (16, 116) therebetween for receiving said spacing means (40, 42, 140, 142).

7. An assembly as set forth in claim 6 further characterized by said spacing means (40, 42, 140, 142) being slideably retained within said separation (16, 116).

8. An assembly as set forth in claim 7 further characterized by said guide means (36, 136) including a fork defining a slot for receiving said cord (20, 120) and for moving said control means (34, 134) circumferentially about said axis (A, AA).

9. An assembly as set forth in claim 8 further characterized by said spacing means (40, 42, 140, 142) including spokes extending radially outward from said axis (A, AA) into said separation (16, 116) for maintaining angular circumferential spacing of said rolling means (38, 138) and said guide means (36, 136).

10. An assembly as set forth in claim 9 further characterized by said spokes (40, 140) extending through said rolling means (38, 138) for rolling said roller means (38, 138) about said axis (A, AA).

11. An assembly as set forth in claim 10 further characterized by said fork (36, 136) being in one of said spokes (42, 142) for the threading of said cord (20, 120) of said loop (32, 132) through said fork (36, 136).

12. An assembly as set forth in claim 11 further characterized by said first (12, 112) and said second (14, 114) members being of an equal diameter on the interior of said side walls (18, 19, 118, 119) thereof.

13. An assembly as set forth in claim 12 further characterized by said rolling means (38, 138) being at least one elastomeric ring for assuming an oval configuration to act as a spring to guide said cord (20, 120).

14. An assembly as set forth in claim 13 further characterized by said first (12) and said second (14) members being hollow cylinders with side walls (18, 19) for coiling said cord (20) into coiled lengths (22, 24) against the interior of said side walls (18, 19).

15. An assembly as set forth in claim 14 further characterized by said first (12) and said second (14) members including ridge means (26, 27) on the interiors of said side walls (18, 19) for supporting said coiled lengths (22, 24).

16. An assembly as set forth in claim 15 further characterized by one of said members (14) including a first cord hole (28) in said side wall (19), said cord (20) extending through said cord hole (28).

17. An assembly as set forth in claim 16 further characterized by said spokes (40, 42) including three spokes (40, 42) equally spaced 120 degrees apart circumferentially about said axis (A).

18. An assembly as set forth in claim 17 further characterized by two of said rolling means (38) rotatably supported by two of said spokes (40).

19. An assembly as set forth in claim 13 further characterized by said first and second members (112, 114) being annular cavities having radially spaced side walls (118, 119) for coiling said cord (120) into coiled lengths (122, 124) between said side walls (118, 119) of each cavity.

20. An assembly as set forth in claim 19 further characterized by said first and said second members (112, 114) including base portions (126, 127) interconnecting each pair of said spaced walls (118, 119) for supporting said coiled lengths (122, 124).

21. An assembly as set forth in claim 20 further characterized by first and said second members (112, 114) including cord holes (128, 129) in said side walls (118, 119) said cord (120) extending through said cord holes (128, 129).

22. An assembly as set forth in claim 21 further characterized by said spokes (140, 142) including two spokes equally spaced 180 degrees apart circumferentially about said axis (AA).

23. An assembly as set forth in claim 22 further characterized by said elastomeric ring (138) rotatably supported by one of said spokes (140).

24. An assembly as set fort in claim 1 further characterized by said first and second coiled lengths being of equal diameter and said rolling means extending axially between said first and second coiled lengths so that said rolling means travel the same linear distances along both of said first and second coiled lengths.

* * * * *